US008414723B2

(12) United States Patent
Määttä et al.

(10) Patent No.: US 8,414,723 B2
(45) Date of Patent: Apr. 9, 2013

(54) METHOD FOR PROTECTING THE UNTRIMMED EDGE OF A PAPERBOARD OR PAPER

(75) Inventors: Päivi Määttä, Imatra (FI); Risto Vesanto, Imatra (FI); Tapani Penttinen, Huutjärvi (FI); Heli Vesanto, Tampere (FI); Pentti Järvelä, Lahti (FI); Marjo Elorae, Tampere (FI); Tapio Hietaranta, Vantaa (FI); Martti Turunen, Sysmä (FI); Ritva Turunen, Lahti (FI)

(73) Assignee: Stora Enso Oyj, Helsinki (FI)

( * ) Notice: Subject to any disclaimer, the term of this patent is extended or adjusted under 35 U.S.C. 154(b) by 0 days.

(21) Appl. No.: 12/227,354

(22) PCT Filed: May 14, 2007

(86) PCT No.: PCT/FI2007/050273
§ 371 (c)(1), (2), (4) Date: Mar. 3, 2009

(87) PCT Pub. No.: WO2007/135234
PCT Pub. Date: Nov. 29, 2007

(65) Prior Publication Data
US 2009/0298662 A1 Dec. 3, 2009

(30) Foreign Application Priority Data
May 18, 2006 (FI) ..................................... 20065336

(51) Int. Cl.
*B32B 37/00* (2006.01)

(52) U.S. Cl.
USPC ......... 156/73.4; 156/73.1; 156/157; 156/250; 156/304.3

(58) Field of Classification Search ................. 156/73.1, 156/73.3, 73.4, 157, 159, 250, 304.1, 304.3, 156/304.6
See application file for complete search history.

(56) References Cited

U.S. PATENT DOCUMENTS 4,452,596 A 6/1984 Clauss et al.
4,461,662 A * 7/1984 Onishi ......................... 156/73.4
(Continued)

FOREIGN PATENT DOCUMENTS

EP 0038488 A2 10/1981
EP 1502865 A2 2/2005
(Continued)

OTHER PUBLICATIONS

Finnish Search Report dated Dec. 14, 2006 for Application No. FI20065336.

(Continued)

*Primary Examiner* — James Sells
(74) *Attorney, Agent, or Firm* — Birch, Stewart, Kolasch & Birch, LLP

(57) ABSTRACT

The invention relates to a method for protecting the untrimmed edge of paperboard or paper (1), in which method the untrimmed edge (4) of two adjacent paperboards or papers are protected and attached abuttingly together by sealing a separate profile (3) on both sides of the abutment of the edges (4) by means of ultrasound.

8 Claims, 3 Drawing Sheets

U.S. PATENT DOCUMENTS

| | | | | |
|---|---|---|---|---|
| 4,931,031 | A | 6/1990 | Lisiecki | |
| 5,320,694 | A * | 6/1994 | Dietzsch | 156/73.4 |
| 5,743,989 | A * | 4/1998 | Kumagai et al. | 156/273.9 |
| 5,801,243 | A | 9/1998 | Melzig et al. | |
| 2004/0182498 | A1 * | 9/2004 | Beitz et al. | 156/157 |

FOREIGN PATENT DOCUMENTS

| | | | |
|---|---|---|---|
| EP | 0152616 | A2 | 8/2005 |
| GB | 1013656 | | 12/1965 |
| JP | 51-49231 | A | 4/1976 |
| JP | 55-179114 | U | 6/1979 |
| JP | 56-169051 | A | 12/1981 |
| JP | 58-52110 | U | 4/1983 |
| JP | 60-150908 | U | 10/1985 |
| JP | 3-200536 | A | 9/1991 |
| JP | 5-147128 | A | 6/1993 |
| JP | 2679488 | B2 | 11/1997 |
| JP | 2000-211627 | A | 8/2000 |
| JP | 2005-14975 | A | 1/2005 |
| JP | 2006273396 | A | 10/2006 |
| WO | WO-84/04486 | A1 | 11/1984 |
| WO | WO-99/25548 | A1 | 5/1999 |

OTHER PUBLICATIONS

English translation of Japanese Notification of Reasons for Rejection dated Apr. 3, 2012 for Japanese No. 2009-510481.

* cited by examiner

METHOD FOR PROTECTING THE UNTRIMMED EDGE OF A PAPERBOARD OR PAPER

FIELD OF THE INVENTION

The present invention relates to a method for protecting the untrimmed edge of a paperboard or paper.

BACKGROUND OF THE INVENTION

Good sealing is required of food packages; that is, they must prevent moisture, microbes and other sources of contamination from coming into contact with the product, as well as prevent the product from penetrating the package. A commonly used package material is paperboard whose barrier properties have been improved by adding various coating layers onto the surface of the paperboard. In food packages, plastic layers are generally used, whose material is, for example, polyethylene (PE) or polyethelene terephtalate (PET). When preparing blanks for paperboard packages, sheets are cut from a coated paperboard web, and the cut edges thus form a weak point in view of the package, the so-called untrimmed edge that is not protected with a coating layer. This untrimmed edge must be sealed to provide sufficient impermeability for the packages and to prevent the absorption of the material to be packed into the paperboard as well as to prevent sources of contamination from coming into contact with the material to be packed. Commonly used methods for sealing the untrimmed edge include taping, heat-sealing and skiving, that is, the milling of the edge to be thinner, and the double-bending of this feather edge to seal the untrimmed edge.

Document EP 0 152 616 discloses a method and an apparatus for protecting a raw edge in paper laminates. In this method, the edge of the paper laminate is treated with a laser beam, wherein part of the open paperboard layer between the laminate layers is removed with the laser beam. After this, the laminate layers remaining in the edge are pressed together, and the edge is sealed by heating. The method can be used either continuously or for single sheets.

U.S. Pat. Nos. 5,801,243 and 4,931,031 disclose methods for protecting the raw edge of coated paperboard, based on skiving, that is, the thinning of the edge, followed by bending of the feather edge. The edge of the paperboard is thinned by cutting off a thin slice, leaving the coating layer and a thin layer of the paperboard, and the feather edge is then folded so that the raw edge of the paperboard is protected. The method disclosed in U.S. Pat. No. 4,931,031 is suitable for continuous sealing of a raw edge.

International publication WO 99/25548 discloses yet another method for the manufacture of package blanks with protected raw edges. In the method, the coating of the paperboard and the protecting of the edges is started in a continuous web, after which the web is cut into sheets. All the edges of the paperboard sheets are protected so that the coating layer on the surface of the sheets extends over the edge to be protected, and this outreaching strip is folded over the edge and sealed onto the edge. Finally, package blanks are formed of the paperboard sheets by sealing the edges of the sheets together.

Publication GB 1 013 656 discloses the seaming of two adjacent edges abuttingly together by using a coating layer on the surface of the paperboard and heat-sealing it onto the surface of the adjacent paperboard.

In the above-mentioned methods, the raw edge of the paperboard or paper is protected by utilizing coating layers already provided on the surface of the paperboard or paper.

The edge of the paperboard or paper is trimmed so that the raw edge can be closed by folding and sealing the coating layer over the raw edge to be protected. Such methods require several different work stages before the raw edge is protected.

SUMMARY OF THE INVENTION

The aim of the invention is to disclose a method for protecting the untrimmed edge of paperboard or paper, which method enables the continuous and quick sealing of the untrimmed edges and which can be simultaneously used for attaching two adjacent edges together. To achieve this aim, the method according to the invention is primarily characterized in that the protection of two adjacent untrimmed edges of paperboard or paper, and their attachment abuttingly together, are performed by sealing a separate profile onto both sides of the abutment of the edges by ultrasound.

In the method, the sealing of the untrimmed edge is performed in a continuous manner by introducing a separate profile to be sealed, in the form of a band with a suitable width or a profile with a finished shape, to the point to be sealed where it is sealed by ultrasound to the edge of the paperboard or paper. In this context, continuous ultrasound sealing means that the sealing takes place in a continuous manner over the whole length of the area to be sealed. The point at which the elongated band or profile is sealed onto the material will move on in the longitudinal direction of its edge or edges. Normally, this takes place in such a manner that the paperboard or paper moves forward in relation to the ultrasound sealing apparatus, and the band or profile is fed to the sealing point.

Paperboard or paper refers, in this context, to coated paperboard or paper. The profile to be sealed, used for sealing the edge, may consist of any material suitable for ultrasound sealing, particularly any thermoplastic material.

When it is entered to the ultrasound sealing, the paperboard or paper is in the form of a continuous web or a blank, and the profile to be sealed is entered in the form of a continuous band with a suitable width and shape. The ultrasound sealing is based on the melting of the material to be welded and the compression of the pieces to be attached together, to provide an impermeable and uniform seam. The method according to the invention is used particularly for protecting two adjacent edges and for attaching them together by means of one or two profiles, or for forming package blanks. The method according to the invention may also be used for the sealing of the untrimmed edge of a continuous web. The attaching of two adjacent edges is performed by means of a butt joint.

By the method according to the invention, the untrimmed edge of paperboard or paper can be protected from exposure to the inside as well as to the outside.

Ultrasound sealing is a quick method, wherein it is especially well suited for the continuous sealing of an untrimmed edge and for large series of package blanks, and it can be easily incorporated in an industrial packaging process. Ultrasound sealing is also flexible as a method, so that it is easy to change the thickness, width and material of the profile to be sealed, or the size of the package blank to be sealed. On the inside and outside of the package, it is possible to use profiles made of different materials, according to the desired properties of the package. Furthermore, protecting the seam with separate profiles on each side of the butt joint will also reinforce the package.

As to the purchase price, ultrasound apparatuses are considerably less expensive than laser apparatuses, and safer to use. Compared with skiving lines, in which the untrimmed edge is first milled thinner and then folded, the ultrasound apparatus is considerably smaller in size; and as a method, ultrasound sealing requires fewer working stages. Furthermore, ultrasound sealing is energy-efficient, because no extra heat needs to be applied to form the seam.

BRIEF DESCRIPTION OF THE DRAWINGS

In the following, the invention will be described in more detail with reference to the appended drawings, in which.

DETAILED DESCRIPTION OF THE INVENTION

The method according to the invention can be used for sealing the untrimmed edge of a continuous web or for protecting two adjacent edges and attaching them together by means of one or two profiles. Furthermore, the method can be applied for forming package blanks, for example by sealing the edges of a folded web or a package blank together. A butt joint is used for attaching the edges together.

Figure 1:
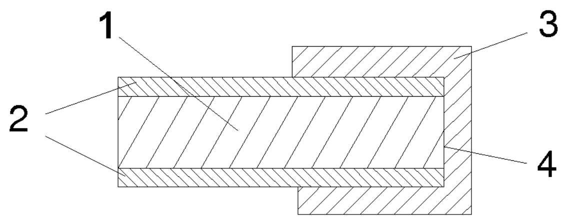
FIG. 1 shows, in a cross-sectional view, the protection of the untrimmed edge of paperboard or paper by means of a separate profile.

FIG. 1 shows how an untrimmed edge 4 of paperboard or paper 1 with no protective layer 2 is protected by ultrasound sealing of the edge with a separate profile 3 to be folded around the edge 4. The paperboard or paper 1 is coated on both sides with a coating layer 2. The paperboard or paper may form the edge of a continuous web or a package blank.

Figure 2:
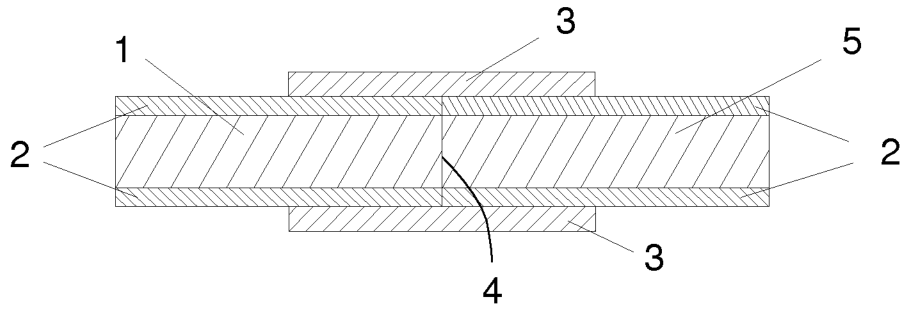
FIGS. 2 to 5 show, in cross-sections, how two adjacent edges according to the invention are protected and attached abuttingly together by means of one or two profiles.

FIG. 2 shows two adjacent paperboards or papers 1 and 5 coated on both sides with a coating layer 2. The two adjacent untrimmed edges 4 are protected and attached together by ultrasound sealing of a profile 3 onto both sides of the abutment 4 of the edges. Thus, the method requires two separate profiles 3, for both sides of the abutment 4.

Figure 3:
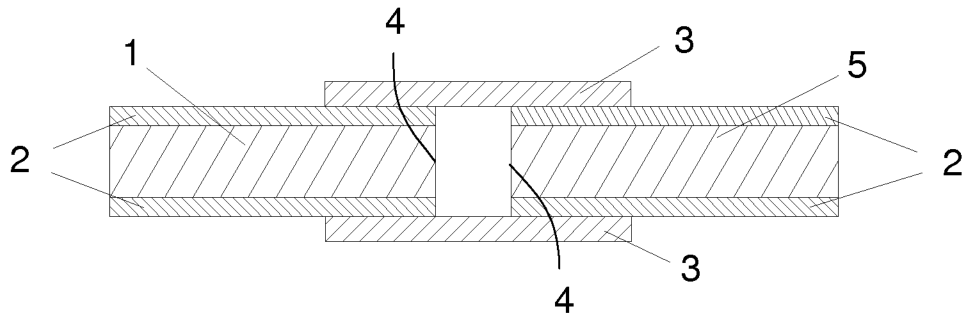

In the same way as in FIG. 2, FIG. 3 shows how two adjacent untrimmed edges are protected and attached together, but in this case a small gap is left between the untrimmed edges 4. This makes it possible to cut the seam in half after the edges 4 have been fastened together with separates profiles 3 on both sides of the abutment. Thus, there will be enough profile 3 for sealing the untrimmed edges 4 after the seam has been cut in half. A suitable method for cutting off the edges is ultrasound, because then the profile strips remaining above and below the edge 4 of the paperboard or paper at the gap can be simultaneously sealed onto the edge 4 to be protected, and no separate sealing stage will be needed. By this method, two edges or package blanks are produced, whose untrimmed edges are protected.

Figure 4:
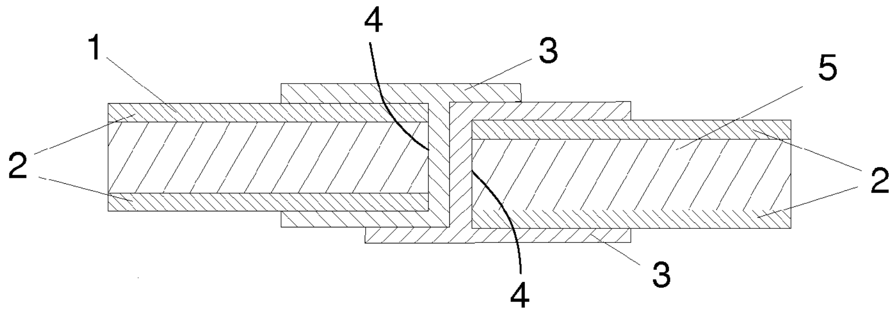
Figure 7A:
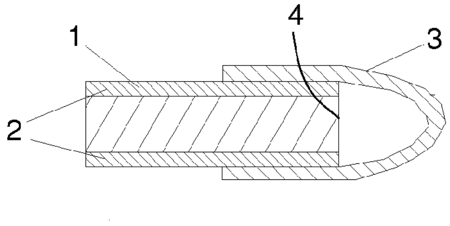
Figure 7B:
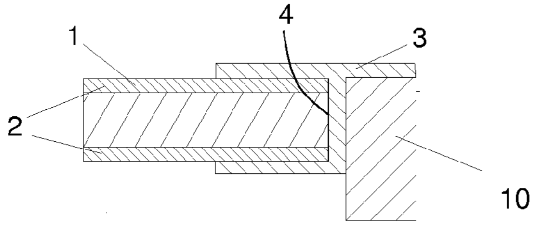

FIG. 4 shows two adjacent paperboards or papers 1 and 5 coated on both sides with a coating layer 2. The untrimmed edges 4 are protected separately for both edges 4 with the profile 3 so that a strip is formed at the edge. This is produced by the method shown in FIGS. 7*a* and 7*b*. First, some profile 3 is sealed onto the edge 4 of the paperboard or paper 1 as shown in FIG. 7*a*, so that the profile 3 forms a loose bag around the edge 4, wherein free space is left between the edge 4 and the profile 3. After this, the profile 3 is pressed by means of a guide 10 against the edge 4 in a desired shape, as shown in FIG. 7*b*. After the strips have been formed at the ends of the edges 4 to be attached, the two adjacent edges 4 are attached abuttingly together by sealing these strips to the edge of the adjacent paperboard or paper 1, 5 by ultrasound. Another alternative is to seal a ready-shaped profile 3, already provided with said strip, onto the edge 4 of the paperboard or paper and then to seal the adjacent edges together by means of these ready-shaped profiles. The design of the profile or profiles may also be different from the strip shown in FIG. 4, provided that the shape of the profile makes it possible to seal the adjacent edges together.

Figure 5:
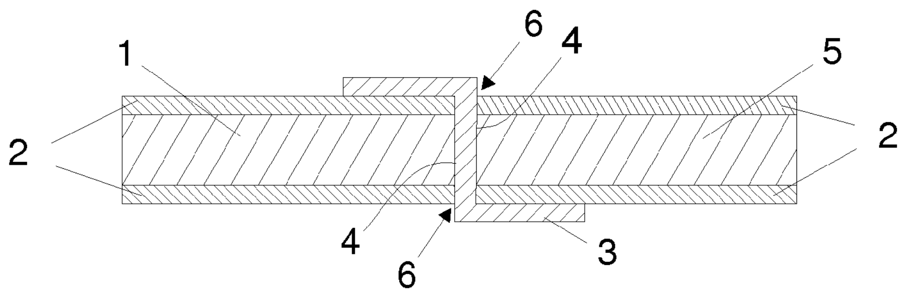

FIG. 5 shows two adjacent paperboards or papers 1 and 5 coated on both sides with a coating layer 2. The untrimmed edges 4 are sealed together with a single profile 3 in such a way that the middle part of the profile 3 is left between the edges 4 to be sealed. By means of inclination of the anvils of the sealing apparatus, the molten profile 3 can be guided in connection with the seaming around the edge 4 of the paperboard or paper so that it protects the edge of the paperboard or paper on both sides of the abutment, even though the profile 3 is bent to only one side of the abutment, as shown in FIG. 5. Thus, no weak point 6, as shown in FIG. 5, is formed in the connection point of the profile 3 and the edge 4, but an impermeable sealing can be formed to protect the untrimmed edges. This embodiment requires the use of a sufficiently wide profile, so that the molten profile can be formed on both sides of the abutment.

In the above-presented FIGS. 2 to 5, the connection of two adjacent edges is made by a butt joint which is used particularly for attaching the edges of packages and package blanks together. The butt joint makes it possible to provide packages with thin and impermeable seams when compared, for example, with the method presented in WO 99/25548, in which the sealing of package blanks and the attaching of the edges are implemented with an overlapped joint. In overlapped joints, the edges are placed on top of each other and sealed together, wherein the seam becomes thick and it may cause problems in the impermeability of the package, particularly at the end seams. The problems are due to the fact that when the end of the package is sealed, there are two layers of paperboard or paper to be sealed, but if an overlapped joint is used, there are thus three layers of paperboard or paper at the side seams. Problems may occur in the impermeability of the package at areas with a shift from three layers to two layers. This problem does not occur when a butt joint is used in the side seams of packages.

Figure 6:
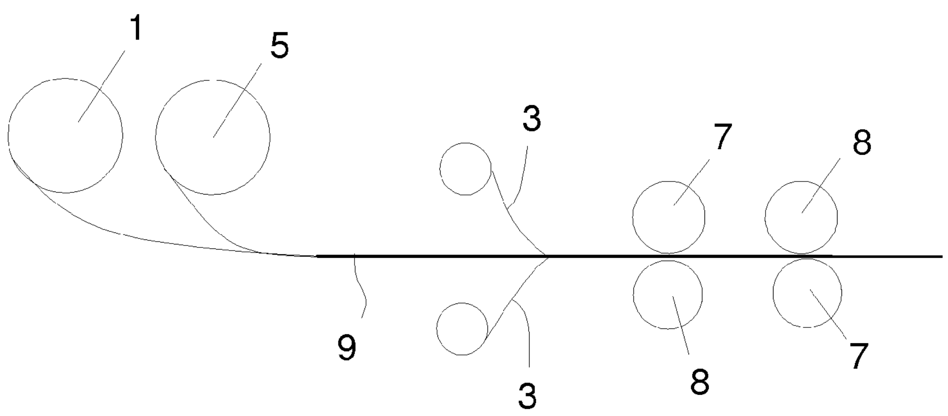
FIG. 6 shows, in a process chart, the attaching of two adjacent edges together, FIGS. 7*a, b* show, in cross-sectional views, the formation of a profile strip at the edge of the paperboard or paper.

Two adjacent edges are attached together in a way shown in FIG. 6, by introducing two edges of paperboard or paper 1 and 5 in parallel 9 (at different locations in the direction of the line) and also two separate profiles 3 on both sides of the abutment. The profiles 3 can be fastened with a single ultrasound apparatus, but to improve the quality and efficiency of the product, it is advisable to use two successive sealing apparatuses in the direction of the edge/edges, in which the sonotrode 7 and anvil 8 are placed in inverse positions, respectively. After the sealing, the profile 3 is cut at the edge of the package blank or web, after which the package blank or web is ready for further processing.

The process steps shown in FIG. 6 are also the same for sealing the untrimmed edge of a single web or package blank, but then only one profile 3 will be needed, which is bent to U-shape before the sealing, to provide the sealing of the edge shown in FIG. 1. The profile is sealed to the edge typically by using two sealing apparatuses, as shown in FIG. 6. First, the profile bent to U-shape is sealed to one side of the edge, so that the opposite side also adheres partly to the edge, and then the opposite side of the profile is sealed by the second ultrasound apparatus, in which the sonotrode 7 and the anvil 8 are placed the other way around than in the first apparatus. Alternatively, the profile in the form of a band may first be sealed to one side of the edge and only then be bent by means of a guide over to the other side of the edge, and sealed. In both alternatives, two ultrasound apparatuses are needed, in which the sonotrode 7 and the anvil 8 are placed in inverse positions, respectively, but the bending of the profile takes place in a different step.

The abutment joints shown in FIGS. 2 and 3 can be used for attaching together the edges of the same blank or web bent towards each other. They can be used, for example, for attaching the edges of a bent web or package blank, that is, for forming a so-called tube. The web or package blank to be sealed is bent to the shape of a tube before the sealing apparatus, wherein the anvil of the sealing apparatus and one of the profiles to be sealed are left inside the tube. Both the sonotrode of the sealing apparatus and the separate profile are outside the tube. After the sealing, the tube formed can be cut into package blanks of desired size.

As a working method, ultrasound welding is known as such, and it is widely used for joining plastic parts because of the firm joint formed by it and the simple hardware. In ultrasound sealing, the sealing of the profile to the edge of paper or paperboard equipped with a coating layer is based on the quick heating of the sealing surfaces caused by a vibrating sonic source that produces heat by internal friction in the seam to be welded. The sonic source vibrates at a frequency of 15 to 40 kHz. Thanks to this and the compression force applied to the sealing point, the material of the sealing surfaces melts, after which the pieces to be sealed are still pressed together for a short time during the cooling, to form an impermeable and strong seam. The total time used for the sealing is not more than in the order of a few seconds.

The compression force needed for the sealing can be provided by using an anvil that is embossed so that the welding energy can be transferred as well as possible to the seam to be formed. Alternatively, the sonotrode may also be embossed. However, the embossing must not disrupt the surface of the profile to be seamed. The embossing of the anvil or the sonotrode is provided by spark machining or by another corresponding method. A suitable average surface roughness (Ra) for the anvil or the sonotrode is, for example, 3 to 15 μm, but it varies to a great extent according to the materials to be sealed. The anvil used in the method is normally rotatable, because the anvil is used as a pulling roller and transfers the edge to be sealed forward and thereby enables the continuous sealing of the edge. For this reason, particularly the embossing of the anvil is important, to keep the edge to be sealed constantly in motion. By the rotating speed of the anvil, the sealing rate used can be adjusted to be suitable, depending on the materials to be sealed and their thickness. For example, the sealing rate may be in the order of 5 m/min. The sealing is performed continuously for the whole length of the edge to be sealed, and after the sealing, the profile band to be sealed is cut off at the edge of the package blank or web to be sealed.

In continuous ultrasound sealing, the anvil 7 used as a pulling counter element is normally rotating and the sonotrode 7 is stationary, but it is also possible that both the sonotrode 6 and the anvil 7 are rotating, or that the sonotrode 6 is rotating and the anvil is stationary during the sealing. Particularly when the sonotrode is rotating, its surface is embossed, because the sonotrode is thus used as a pulling element.

The paperboard or paper must consist of plastic coated paperboard or paper, so that the profile protecting the untrimmed edge can be fastened by ultrasound to the edge of the paperboard or paper. The profile used may consist of any material suitable for ultrasound sealing. In particular, many thermoplastic materials may be used, for example polyethylene (PE), polyethylene terephtalate (PET), polypropylene (PP), polybutene terephtalate (PBT), ethylene vinyl alcohol (EVOH), polyethylene vinyl acetate (EVA), or polyamide (PA). Profiles made of bioplastic may also be used. However, the use of the package to be manufactured sets the constraints on the material to be used for the sealing, to achieve sufficient protecting and attaching properties. Also, the thickness and width of the profile to be used vary according to the use and the sealing method. On the inside and outside of the package, it is possible to use profiles made of different materials, according to the properties set by the package. For example, in a profile to be used inside the package, it is possible to take food compatibility into account. The visual appearance of the package can also be improved, when some profile is seamed on both sides of the abutment.

The method makes it possible to manufacture packages which are impermeable to gas, liquid, grease and vapour, and which are typically used for packaging food. The invention can also be used for the packaging of other products, for example such products which must not lose their moisture or which contain substances that may evaporate from the product to the environment.

The invention is not intended to be limited to the embodiments presented as examples above, but the invention is intended to be applied widely within the scope of the inventive idea as defined in the appended claims.

The invention claimed is:

1. A method for protecting untrimmed edges of two adjacent paperboards or papers (1, 5) continuous in such a way that at least one separate profile (3) is disposed at a portion to be sealed and the at least one separate profile is sealed to the edges (4) of the paperboards or papers (1, 5), comprising the steps of:

disposing the at least one separate profile (3) between the edges (4) of the paperboard or paper (1, 5) in such a way that a middle part of the at least one separate profile (3) is left between the edges (4) of the one of the paperboard or paper (1, 5);

abutting the edges (4) of the paperboard or paper (1, 5) onto the edge (4) of the the paperboard or paper (1, 5), so that the edges (4) of the two adjacent paperboards or papers (1, 5) are attached abuttingly together via the least one separate profile (3) and the at least one separate profile (3) is sealed on both sides of the abutment of the edges (4) by means of ultrasound, the at least one separate profile (3) is sealed onto at least one edge (4) of the paperboard or paper (1, 5) so that the least one separate profile (3) forms a loose bag around the at least one edge (4) with a space being left between the at least one edge (4) and the least one separate profile (3), the least one separate profile (3) is pressed by a guide (10) against the at least one edge (4) to form a desired shape, and then the edges (4) are attached and sealed abuttingly together each other by ultrasound, so that the edges (4) of the paperboards or papers (1, 5) are separately protected by the least one separate profile (3).

2. The method according to claim 1, wherein the abutment joint of two adjacent edges is used for attaching the edges of a folded web or package blank together.

3. The method according to claim 1, wherein the material of the at least one separate profile (3) used is a thermoplastic material, such as one of the following: PE, PP, PET, PBT, EVOH, EVA, or PA.

4. The method according to claim 1, wherein the paperboard or paper (1, 5) is coated paperboard or paper.

5. The method according to claim 4, wherein the coating (2) is a plastic coating.

6. The method according to claim 4, wherein the coated paperboard or paper is a web, a package, or a package blank.

7. The method according to claim 1, wherein the method is used for the manufacture of packages and package blanks that are impermeable to gas, liquid, grease, and vapor.

8. The method according to claim 1, wherein the least one separate profile is a continuous profile, and the continuous profile is provided between the edges of the paperboards or papers by moving the continuous profile and the paperboards or papers in the direction of the edges to be seamed, so that the seal is formed at the edges.

* * * * *